United States Patent
Vogt

(10) Patent No.: US 7,300,028 B2
(45) Date of Patent: Nov. 27, 2007

(54) TRIPOD HEAD

(76) Inventor: Philippe Vogt, Frohalpstrasse 65, Ch-8038 Zurich (CH)

( * ) Notice: Subject to any disclaimer, the term of this patent is extended or adjusted under 35 U.S.C. 154(b) by 150 days.

(21) Appl. No.: 10/838,127

(22) Filed: May 3, 2004

(65) Prior Publication Data

US 2005/0001116 A1    Jan. 6, 2005

(51) Int. Cl.
   *F16M 11/02*    (2006.01)
(52) U.S. Cl. .............. 248/181.1; 248/288.51; 248/181.2; 248/177.1; 248/288.31; 248/178.1; 248/179.1; 403/76; 403/90; 403/114; 403/122; 403/125
(58) Field of Classification Search ........... 248/177.1, 248/176.2, 127, 181.1, 181.2, 176.3, 178.1; 403/76, 90, 114, 122, 125
See application file for complete search history.

(56) References Cited

U.S. PATENT DOCUMENTS

| | | | | |
|---|---|---|---|---|
| 4,974,802 A * | 12/1990 | Hendren | ........... | 248/181.1 |
| 5,072,907 A * | 12/1991 | Vogt | ........... | 248/181.1 |
| 5,590,870 A * | 1/1997 | Goellner | ........... | 269/21 |
| 5,782,572 A * | 7/1998 | Thiem | ........... | 403/90 |
| 5,806,821 A * | 9/1998 | Phillips et al. | ........... | 248/288.51 |
| 6,164,843 A * | 12/2000 | Battocchio | ........... | 396/419 |
| 6,352,228 B1 * | 3/2002 | Buerklin | ........... | 248/181.1 |

FOREIGN PATENT DOCUMENTS

| | | |
|---|---|---|
| DE | 0612723 | 5/1935 |
| DE | 2203196 | 8/1973 |
| FR | 1018869 | 1/1953 |
| FR | 2346594 | 10/1977 |
| FR | 2799807 | 4/2001 |

* cited by examiner

*Primary Examiner*—Carl D. Friedman
*Assistant Examiner*—Todd M. Epps
(74) *Attorney, Agent, or Firm*—Abelman, Frayne & Schwab

(57) ABSTRACT

A tripod head includes a cylindrical housing 1 having connection member at one end for a tripod, a ball joint (2) rotatably and pivotally arranged in the housing (1), a bearing element (4) for the ball joint (2), having a sliding surface (7) contacting the circumference of the ball joint (2) and arranged so as to be axially displaceable and rotatable in the housing (1), and a device (5) for fixing the ball joint (2) and having a support (6) for the bearing element 4 and an adjusting device (25) in operative connection with the support (6) in order to displace the bearing element against the ball joint to achieve the clamping action.

1 Claim, 3 Drawing Sheets

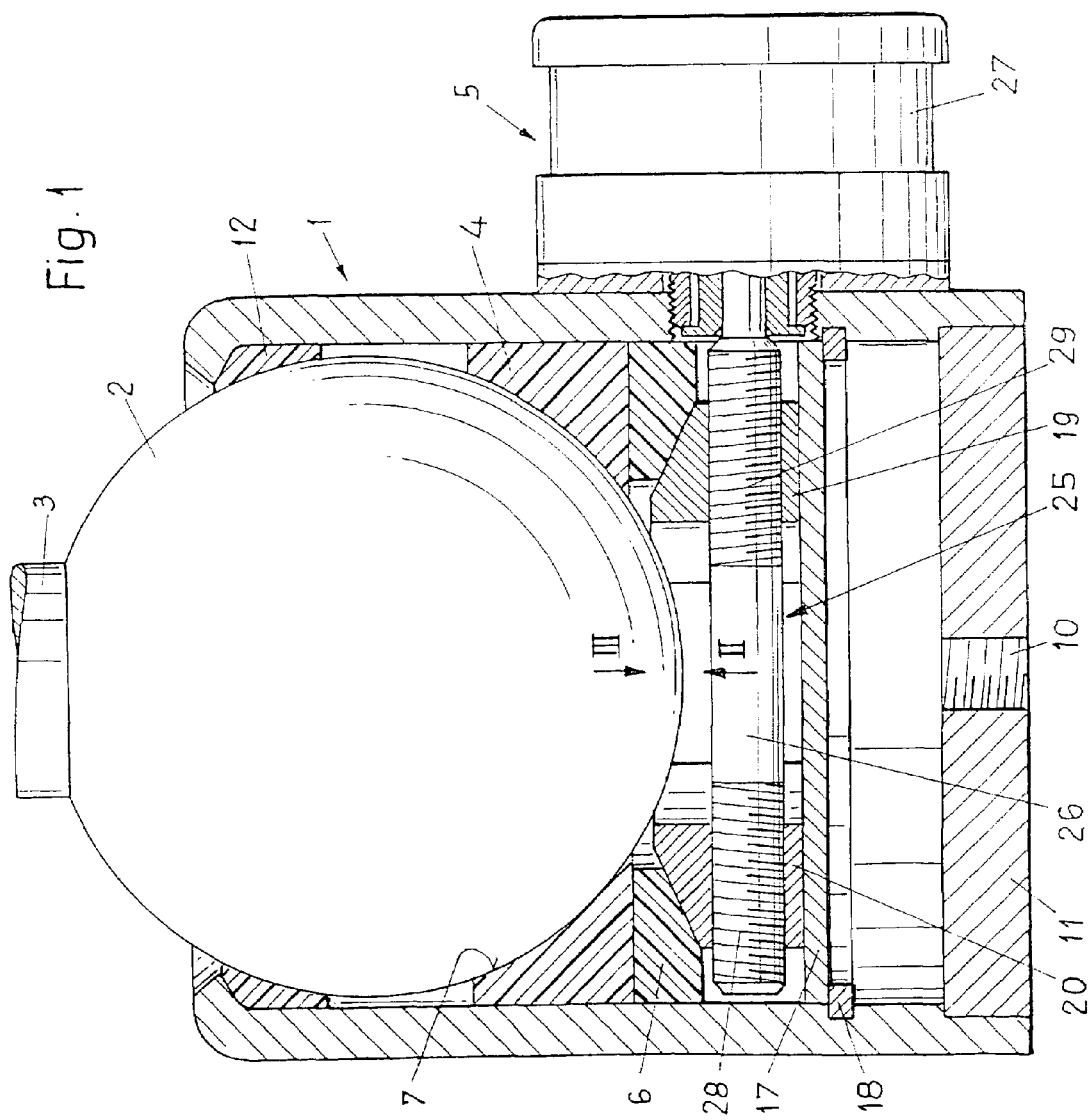

TRIPOD HEAD

BACKGROUND OF THE INVENTION

1. Field of the Invention

The present invention relates to a tripod head including a cylindrical housing having a connection element at one end for a tripod, a ball joint displaceably arranged in the housing, a bearing element for supporting the ball joint which is axially displaceable in the housing, and a device for fixing the ball joint and which is arranged below the bearing element.

2. Description of the Prior Art

DE 22 03 196 discloses a tripod head which has a cylindrical housing with a bottom part for fastening to a tripod and with a rotatably arranged upper part, a ball joint which is supported in a housing so as to be freely rotatable and swivelable, and a fixing arrangement with a clamping part for the ball joint, a fixing member, and a set screw for pressing the ball joint against the upper part to achieve a clamping action.

The tripod head is disadvantageous, particularly in large-format cameras, in that the required clamping action cannot be applied to the ball joint when the image carrier or objective carrier is tilted and an optical instrument is not held so as to be free of vibrations, and in that the functional features of rotating and fixing the ball joint are carried out by the fixing arrangement as a whole.

An object of the invention is to provide a tripod head in which the drawbacks of the prior art tripod heads, such as disclosed in DE 22 03 196, are eliminated.

SUMMARY OF THE INVENTION

This and other objects of the present invention, which will become apparent hereinafter, are achieved by providing a tripod head of the type discussed above is which the device for fixing the ball joint in the housing and which is arranged beneath the bearing element, includes two sliding parts, an adjusting device for engaging the sliding parts for axially displacing the ball joint in the housing, and a support located between the bearing element and the sliding parts and having engagement shoulders arranged diametrically opposite each other.

The invention is based on the idea of providing separate means for carrying out the functions of rotating and fixing the ball joint. For this purpose, a bearing element with a sliding surface contacting the outer circumference of the ball joint is arranged in the housing so as to be displaceable and rotatable, and a device for fixing the ball joint with an axially displaceable support for the bearing element and with means in operative connection with the support are provided for displacing the bearing element to achieve a clamping action.

The advantages which can be achieved by the invention consist in that the optical instrument can be adjusted in a simple manner.

It is advantageous when the bearing element is formed as a shell. The rotating movement and the swiveling movement of the ball joint are accordingly stabilized.

In one of the embodiment of the invention, a rolling bearing is arranged between the bearing element and the support. This is advantageous in that it improves the running characteristic of the bearing element during rotation.

In a preferred embodiment, the fixing device has a support with two projections or shoulders which are provided with a diagonal surface, and the two sliding parts are each provided with a diagonal surface and are arranged so as to be supported on a stationary base, with their diagonal surfaces contacting the diagonal surfaces of the shoulders and so as to be displaceable transverse to one another. The fixing device further includes an adjusting device and an adjusting member which engages with the sliding parts and with an actuating element for displacing the sliding parts transverse to the shoulders at the support by a rotating movement and for displacing the bearing element against the ball joint in order to achieve the clamping action.

The advantages which can be achieved in this way consist in that a reliable clamping action is achieved, and the vibrations occurring at the optical instrument are effectively damped.

The device for fixing the ball joint can have a support for the bearing element which is constructed as an annular body with plane end faces, at least one member with an eccentric contour and engageable with the support, and an adjusting device with an adjusting member which is connected to the one member and to an actuating element which is connected to the adjusting member in order to displace the bearing element against the ball joint. This device has the advantage of a simple and economical construction.

In a further embodiment, the support is provided with a recess in which the eccentric member engages. An axial rotating movement of the support is prevented in this way.

In another embodiment, the support has an L-shaped cross section and engages with the adjusting member. This prevents an axial rotating movement.

The ball joint can have a contour such that the clamping action increases or decreases depending on the swiveling movement. Accordingly, a greater damping is achieved in an advantageous manner so that the center of gravity of the instrument fastened to the ball joint can lie outside of the circumference of the ball joint during swiveling.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

In the Drawings:

FIG. 1 shows a cross-sectional view of a preferred embodiment of a tripod head according to the present invention;

FIG. 2 shows a view of a support according to FIG. 1 viewed in direction of arrow II;

FIG. 3 shows a view of a fixing device viewed in direction of arrow II;

DETAILED DESCRIPTION OF PREFERRED EMBODIMENTS

Figure 4:
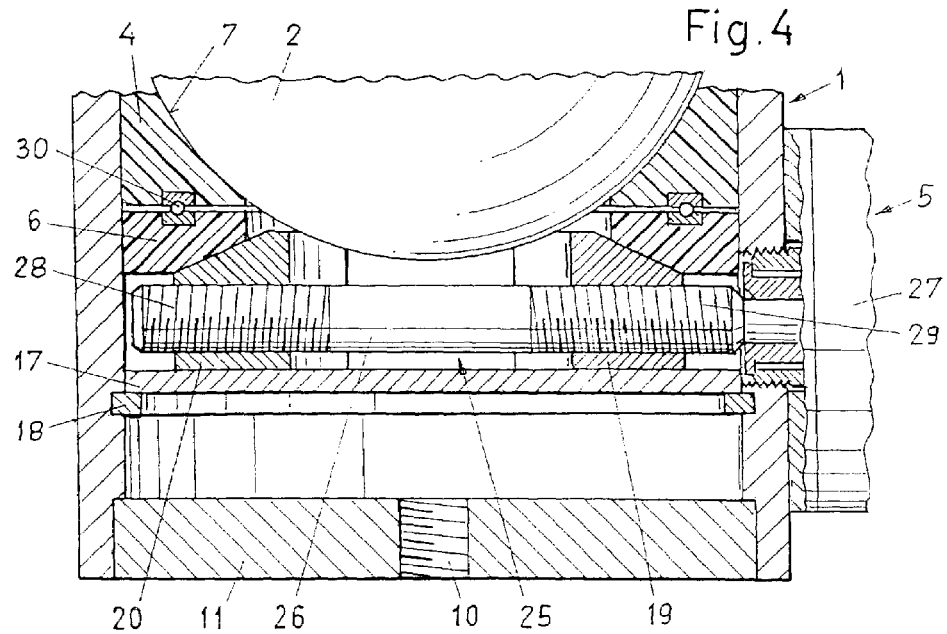
FIG. 4 shows a cross-sectional view of another embodiment of a tripod head according to the present invention.

A tripod head according to the present invention substantially comprises a cylindrical housing 1, a ball joint 2 with a member 3 for connecting to an optical instrument which is pivotally and rotatably arranged in the housing 1, a bearing shell 4 for the ball joint 2, and a device 5 for fixing the ball joint 2.

As shown in FIGS. 1 to 3, the housing 1 is closed at one end by a plate 11 which is provided with a threaded borehole 10 for connecting to a tripod. At the other end, the housing 1 is provided with a bearing ring 12 for the ball joint 2.

Depending on the construction of the tripod head, the ball joint 2 is formed as a symmetric or asymmetric rotational body or a flattened rotational ellipsoid, i.e., having an approximate shape of a globe with a larger diameter in the area of the equator.

The bearing shell 4 is provided with a sliding surface 7 in contact with the circumference of the ball joint 2, and is arranged in the housing 1 so as to be axially displaceable and rotatable. The bearing shell 4 is supported on the device 5 for fixing the ball joint. The bearing shell 4 is made of plastic.

The device 5 is arranged on a plate 17 which is held in the housing 1 by a Seeger ring 18. The device 5 comprises a support 6, two sliding parts 19, 20, and an adjusting device 25.

The support 6 is formed as an annular body having a plane support surface for the bearing shell 4 on one front side and two shoulders 13, 14 at the other front side. The shoulders 13, 14 are arranged opposite one another and each has a diagonal surface 15 (FIG. 2).

The two sliding parts 19, 20 lie on the plate 17 on one side and are provided with a diagonal surface 21 on the other side. The diagonal surfaces 15 at the support 6 and at the sliding parts 19, 20 are inclined in opposite directions by the same angle of inclination. The support 6 and the sliding parts 19, 20 are arranged with their diagonal surfaces 15, 21 contacting one another so that a radial displacement of the sliding parts 19, 20 causes a displacement of the support 6 in direction of the ball joint.

This radial displacement is effected with the adjusting device 25 which comprises a threaded spindle 26 and a turning knob 27. For this purpose, a threaded hole is provided in each of the sliding parts 19, 20 and threaded portions with left-handed and right-handed threads 28, 29, respectively, are formed at the threaded spindle 26, the sliding parts 19, 20 being screwed onto these threads. The threaded spindle 26 is guided out of the housing 1 on one side and is provided at this end with the turning knob 27.

In the embodiment shown in FIG. 4, a rolling bearing 30 is arranged between the bearing shell 4 and the support 6.

Figure 5:
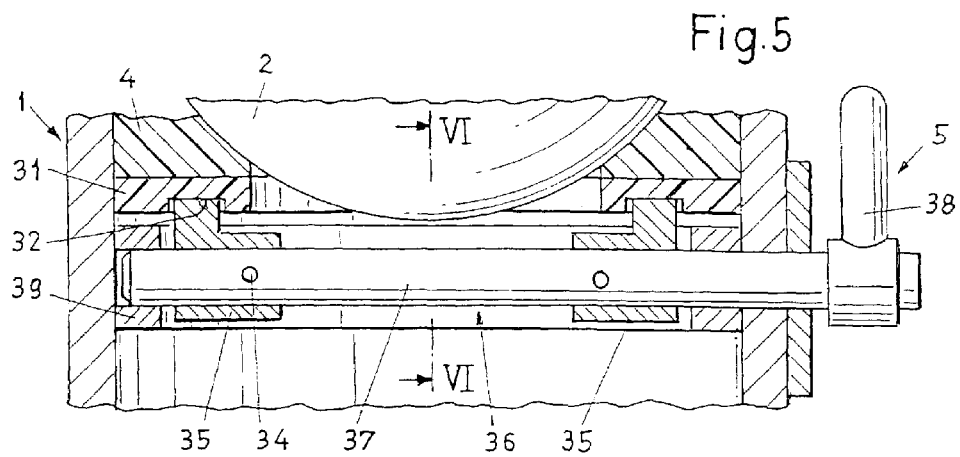
FIG. 5 shows a view of another embodiment of a fixing device.
Figure 6:
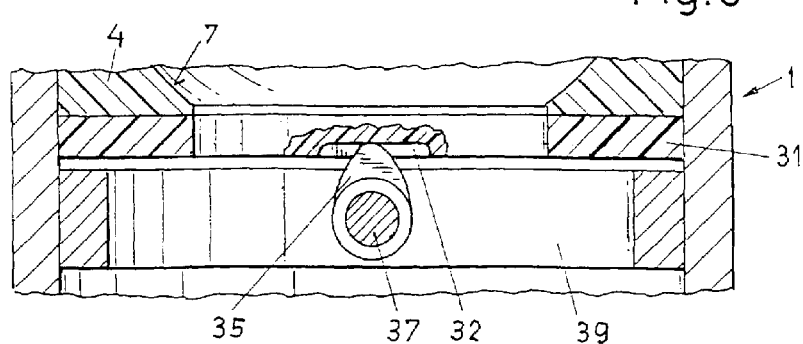
FIG. 6 shows a cross-sectional view along line VI-VI in FIG. 5.

As shown in FIGS. 5 and 6, the support is formed as an annular body 31 which has a plane supporting surface for the bearing shell 4 on one front side and two recesses 32 which are arranged diametrically opposite one another on the other front side.

The device 5 for fixing the ball joint 2 has two cam disks 35 with identical contour and an adjusting device 36 with a shaft 37 and a lever 38. The cam disks 35 are mounted on the shaft 37 by means of pins 34 and engage with the recesses 32 in the support 31. The shaft 37 is mounted in a bearing ring 39 arranged in the housing 1.

Figure 7:
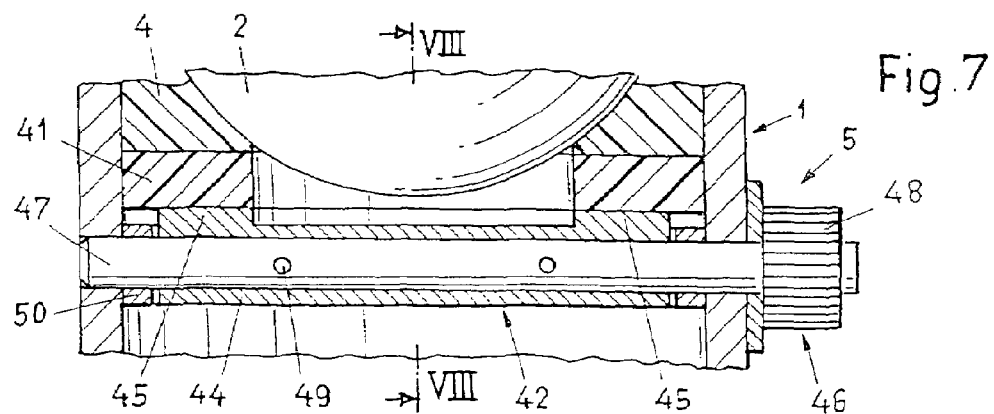
FIG. 7 shows a cross-sectional view of a further embodiment of a fixing device.
Figure 8:
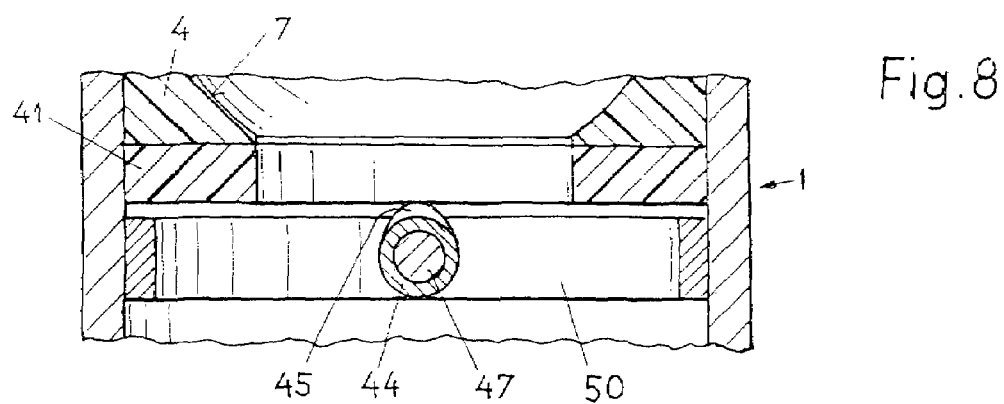
FIG. 8 shows a cross-sectional view along line VIII-VIII in FIG. 7.

As shown in FIGS. 7 and 8. The support 41 is formed as an annular body with two plane end faces.

The device 5 for fixing the ball joint 2 includes a member 42 having a sleeve 44 with two cams 45 formed at a distance from one another, and an adjusting device 46 having a shaft 47 and a turning knob 48. The sleeve 44 is connected to the shaft 47 by two pins 49. A ring 50 is arranged in the housing 1 for orienting the member 42 with respect to the support 41.

Figure 9:
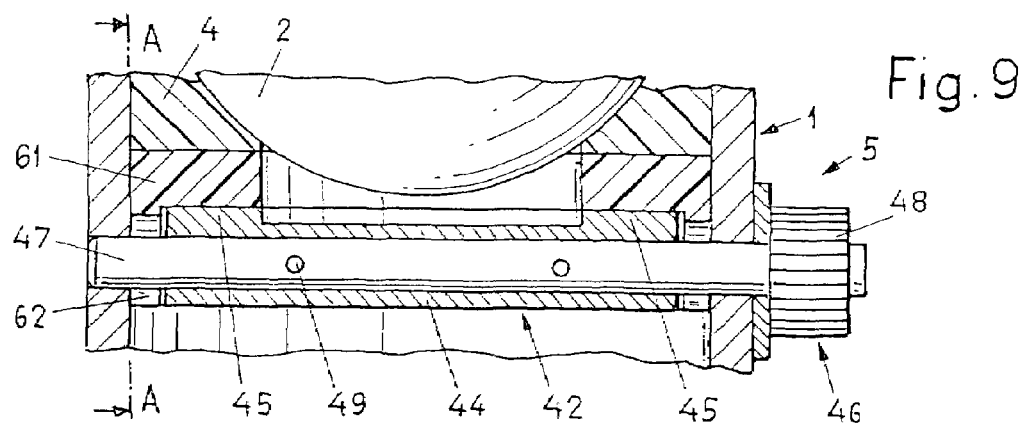
FIG. 9 shows a cross-sectional view of a modified embodiment of the fixing device shown in FIG. 7.
Figure 10:
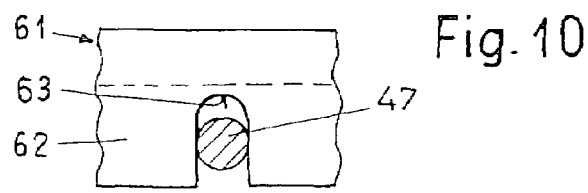
FIG. 10 is a view in direction of arrows A in FIG. 9.

FIGS. 9 and 10 show an embodiment in which the support 61 has an L-shaped cross section and has two oppositely located slots 63 in the leg 62 which engage around the shaft 47 of the adjusting device 46 and consequently prevent a rotating movement of the support 61.

It should be added that the member 42 can comprise a cylindrical body with a through-hole that is offset relative to the axis of the cylindrical body.

Further, the support 61 can be secured against an axial rotating movement by at least one pin.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A tripod head, comprising a housing (1) having connection means (11) at one end thereof for connecting the tripod head to a tripod; an aspherical ball joint (2) displaceably arranged in the housing (1); a bearing element (4) for supporting the ball joint (2) and axially displaceable in the housing (1); and a device (5) for fixing the ball joint (2) in the housing (1) and arranged beneath the bearing element (4), the fixing device (5) having two sliding parts, an adjusting device (36) for engaging the sliding parts for axially displacing the ball joint (2) in the housing (1), and a support (31) located between the bearing element (4) and the sliding parts and having engagement shoulders arranged diametrically opposite each other, wherein the support (31) is formed as an annular body with plane end faces, wherein the two sliding parts (35) are provided with an eccentric contour and engage with the support (31), wherein the adjusting device (36) has an adjusting member (37) which is connected to the sliding parts (35), and an actuating element (38) which is connected to the adjusting member (37) in order to displace the bearing element (4) against the ball joint (2) by a rotating or swiveling movement, and wherein the support (31) has at least one recess (32) engaging with the eccentric contour of at least one sliding part (35) in order to prevent an axial rotating movement of the support (31).

* * * * *